US011932004B1

(12) United States Patent
Flemming

(10) Patent No.: US 11,932,004 B1
(45) Date of Patent: Mar. 19, 2024

(54) METHOD FOR INK CONTROL IN A PRINTING PRESS

(71) Applicant: KOENIG & BAUER AG, Würzburg (DE)

(72) Inventor: Steven Flemming, Berlin (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/287,090

(22) PCT Filed: Aug. 2, 2022

(86) PCT No.: PCT/EP2022/071675
§ 371 (c)(1),
(2) Date: Oct. 16, 2023

(87) PCT Pub. No.: WO2023/016861
PCT Pub. Date: Feb. 16, 2023

(30) Foreign Application Priority Data

Aug. 11, 2021 (DE) ..................... 10 2021 120 841.6

(51) Int. Cl.
*B41F 33/00* (2006.01)

(52) U.S. Cl.
CPC ...... *B41F 33/0045* (2013.01); *B41F 33/0027* (2013.01)

(58) Field of Classification Search
CPC ......................... B41F 33/0045; B41F 33/0027
(Continued)

(56) References Cited

U.S. PATENT DOCUMENTS 5,333,549 A * 8/1994 Feldman ................ B41F 17/00 101/469
9,376,582 B1 6/2016 Dannhauser et al.
(Continued)

FOREIGN PATENT DOCUMENTS

DE 102004003612 A1 8/2005
DE 102008041426 A1 2/2010
(Continued)

OTHER PUBLICATIONS

International Search Report of PCT/EP2022/071675 dated Nov. 25, 2022.

*Primary Examiner* — Charlotte M Baker
(74) *Attorney, Agent, or Firm* — MATTINGLY & MALUR, PC

(57) ABSTRACT

The invention relates to a method for ink control in a printing press, wherein, during an ongoing printing process, an opaque ink (02) is printed onto a print substrate (01) in a first printing unit (06), and subsequently a transparent printing ink (03) is printed onto the opaque ink (02) in a second printing unit (07), at least one actual value of the optical density of the opaque ink (02) being ascertained by a first detection device (08) for this opaque ink (02) printed onto the print substrate (01), a film thickness of this opaque ink (02) to be applied onto the print substrate (01) being set at the relevant printing unit (06) by a control unit (11) detecting the at least one actual value of the optical density of this opaque ink (02), as a function of a previously ascertained value of the optical density of the surface of the unprinted print substrate (01), in such a way that the at least one actual value of the optical density of this opaque ink (02) detected by the first detection device (08) corresponds to a target value set at this control unit (11) for this opaque ink (02), taking a tolerance range defined in the control unit (11) for this opaque ink (02) into consideration; at least one
(Continued)

actual value of the optical density of this printing ink (03) being ascertained by a second detection device (09) for the printing ink (03) printed onto the previously printed opaque ink (02); and a film thickness of this printing ink (03) to be applied onto the opaque ink (02) being set at the printing unit (07) printing this printing ink (03) by the control unit (11) which also detects the at least one actual value of the optical density of this printing ink (03), as a function of the film thickness of the opaque ink (02) previously applied to the print substrate (01) or as a function of the actual value of the optical density of this opaque ink (02), in such a way that the at least one actual value of the optical density of this printing ink (03) detected by the second detection device (09) corresponds to a target value set at the control unit (11) for this printing ink (03), taking a tolerance range defined in the control unit (11) for this printing ink (03) into consideration.

13 Claims, 1 Drawing Sheet

(58) Field of Classification Search
USPC ........................................................ 358/1.9
See application file for complete search history.

(56) References Cited

U.S. PATENT DOCUMENTS

| | | | | |
|---|---|---|---|---|
| 2022/0032669 | A1 * | 2/2022 | Rowe | B41M 3/14 |
| 2022/0161546 | A1 * | 5/2022 | Gibson | B41F 15/34 |

FOREIGN PATENT DOCUMENTS

| | | | | | |
|---|---|---|---|---|---|
| DE | 102014011151 | A1 | | 2/2015 | |
| EP | 1084843 | A1 | | 3/2001 | |
| JP | 2000313103 | A | | 11/2000 | |
| JP | 2018008394 | A | * | 1/2018 | |
| WO | 2005/092613 | A2 | | 10/2005 | |
| WO | WO-2015069513 | A1 | * | 5/2015 | B42D 25/30 |

* cited by examiner

METHOD FOR INK CONTROL IN A PRINTING PRESS

CROSS-REFERENCES TO RELATED APPLICATIONS

This application is the US national phase, under 35 USC § 371, of PCT/EP2022/071675, filed on Aug. 2, 2022, published as WO 2023/016861 A1 on Feb. 16, 2023, and claiming priority to DE 10 2021 120 841.6, filed Aug. 11, 2021, and all of which are expressly incorporated by reference herein in their entireties.

TECHNICAL FIELD

Examples herein relate to a method for controlling the ink in a printing press in which, during an ongoing printing process, an opaque ink is printed onto a print substrate in a first printing unit and, subsequently, a transparent printing ink is printed onto the opaque ink in a second printing unit. At least one actual value of the optical density of the opaque ink is ascertained by a first detection device, configured as a densitometer, for the opaque ink printed onto the print substrate. A film thickness of the opaque ink to be applied onto the print substrate is set at the relevant printing unit by a control unit detecting the at least one actual value of the optical density of the opaque ink, as a function of a previously ascertained value of the optical density of the surface of the unprinted print substrate, and in such a way that the at least one actual value of the optical density of the opaque ink detected by the first detection device corresponds to a target value set at the control unit for the opaque ink, taking a tolerance range defined in the control unit for the opaque ink into consideration.

BACKGROUND

It is known from JP 2000 313103 A to feed an output signal from a detector for detecting the color measurement of the print image of a web to a measuring transducer of a color regulator, wherein the measuring transducer converts the color measurement into an actual thickness value of an ink film for each printing color. A target value converter delivers a specific measurement position to a console and converters a color target value stored in a memory into an ink film target thickness value. The actual thickness value of an ink film and the target thickness value of the ink film are supplied to a processor, where a new adjustment amount of a hydraulic regulator is calculated from the comparison value thereof and a previously programmed constant value.

A method for printing with water-based inkjet inks on a water-impermeable, low-surface-energy substrate is known from U.S. Pat. No. 9,376,582 61. This method comprises: a) modifying surface properties of the substrate to increase the surface energy; b) coating the modified surface of the substrate with a first layer comprising a colorless water-based tie-layer composition; c) coating over the first layer with a second layer containing a colorless and transparent water-based ink-receptive composition containing: i) a water-soluble multivalent metal salt; and ii) a hydrophilic binder polymer; d) depositing directly on the surface of the second layer one or more water-based ink compositions containing an anionically stabilized pigment colorant, wherein the one or more water-based ink compositions are deposited in a predetermined pattern with an inkjet deposition system in response to electrical signals; and e) drying the first and second applied layers and the deposited inks to substantially remove the water.

A method for use in a printing press comprising at least one inking unit is known from DE 10 2008 041 426 A1, wherein at least one setting of the relevant inking unit can be changed by a control device during an ongoing printing process of the printing press, in which a surface of a print substrate is printed, based on at least one measured value detected during this printing process in the printing press. The control device checks the detected measured value for plausibility prior to changing the setting of the relevant inking unit, wherein the plausibility check is carried out based on a check of a reflectance behavior of the surface of the unprinted print substrate and/or a check of a relation of a primary ink density ascertained at a measuring point to a secondary ink density ascertained at the same measuring point at the same time and/or a check of an ink density ascertained in an inking zone of the relevant inking unit in relation to the ink density ascertained in at least one adjacent inking zone of the same inking unit.

A printing press that preferably prints in a multicolor printing process, comprising at least one inking unit comprising a metering device, is known from WO 2005/092613 A2, the metering device of the inking unit being controlled by a control device, the control device being connected to a preferably optical detection device, and the detection device detecting the quality of the print by way of a sensor directed at a surface of a print substrate printed in the printing press.

A device for the densitometric measurement of printed products is known from EP 1 084 843 A1, measurement results of a densitometer measuring head applied against predefined target values being used as actuating commands for an ink feeding of a printing press, and a comparison of the ink density values from one measurement field to those from the neighboring measurement fields of the same color and measurement field type (solid color or halftone) being carried out by an evaluation unit that is arranged downstream from the densitometer and comprises a processing unit.

A method for evaluating an image of a predetermined extract of a printed product is known from DE 10 2004 003 612 A1, ink intensity values detected in an inline ink density measurement being used to regulate an ink supply in an inking unit of a printing press, and a correction made to a white reference, ascertained in a white field, being used to evaluate the ink intensity values used in other measuring fields.

A method for controlling the ink in printing machines by way of a computer by detecting ink surfaces on a surface to be printed using a colorimeter is known from DE 10 2014 011 151 A1, the surface to be printed being a print substrate, the print substrate being coated with opaque white, the colorimeter detecting a number of opaque white color measurement values, and the computer comparing the detected opaque white color measurement values to one another or to a reference color value of the opaque white and storing the deviations ascertained during the comparison in the computer, color measurement fields being printed onto the print substrate coated with opaque white, the color measurement fields printed with opaque white being detected by the colorimeter, and the computer, for controlling the inking process, factoring in the influence of the stored ascertained deviations during the comparison of the color measurement values of the color measurement fields underlaid with opaque white to the target color values of the print master.

During a printing process carried out by a printing press, the optical effect of a printing ink that is applied onto an opaque ink previously applied onto a print substrate is dependent on the film thickness of this opaque ink. This dependence in terms of the optical effect impacts a color control of the printing ink carried out in the printing press during the printing process.

SUMMARY

It is an object of some examples herein to provide a method for controlling the ink in a printing press which, during an ink control of a printing ink, takes the dependence of its optical effect on the film thickness of an opaque ink previously applied onto the printing substrate into consideration.

The object is achieved according to some examples in which, during a printing process, at least one actual value of the optical density of the transparent printing ink is ascertained by a second detection device configured as a densitometer for the transparent printing ink printed onto the previously printed opaque ink. A film thickness of the transparent printing ink to be applied onto the opaque ink is set at the second printing unit by the control unit, which also detects the at least one actual value of the optical density of the transparent printing ink, as a function of the film thickness of the opaque ink previously applied onto the print substrate, or as a function of the actual value of the optical density of the opaque ink, and in such a way that the at least one actual value of the optical density of the transparent printing ink detected by the second detection device corresponds to a target value set at the control unit for the transparent printing ink, taking a tolerance range defined in the control unit for the transparent printing ink into consideration.

The advantages achievable by the invention are in particular that the proposed method, during the ink control of a printing ink carried out in a printing press during the printing process, takes the dependence of its optical effect on the film thickness of an opaque ink previously applied onto the printing substrate into consideration.

BRIEF DESCRIPTION OF THE DRAWINGS

An exemplary embodiment of the invention is illustrated in the drawings and will be described in greater detail below. The drawings show.

DETAILED DESCRIPTION

Figure 1:
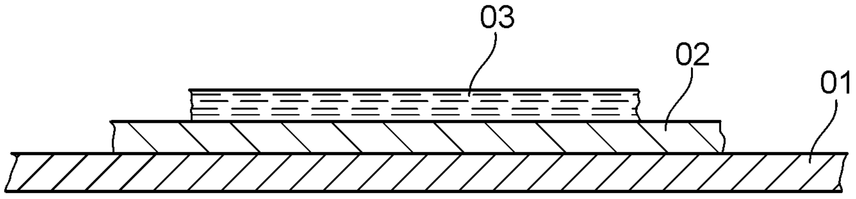
FIG. 1 a layer structure of a printing ink applied onto an opaque ink.

FIG. 1, by way of example, shows a layer structure of a printing ink 03 applied onto an opaque ink 02 in a drastically enlarged sectional illustration, wherein the opaque ink 02 is applied onto a print substrate 01. In reality, at least the respective ink films of the opaque ink 02 and printing ink 03 applied onto the print substrate 01 in general are less than 0.1 mm, wherein the film thicknesses of the different inks can differ and are subject to fluctuations during the printing process. The print substrate 01 used is a sheet-format print substrate 01 or a web-format print substrate 01, made in each case of any material, e.g., made of paper or a plastic material or metal. The sheet-format print substrate 01 is in particular configured as a foil. The print substrate 01 can also be configured to be transparent. Opaque white or another non-transparent opaque color, i.e., thoroughly covering the backing, in particular the print substrate 01, for example in one of the color shades encompassing gold or silver is preferably used as the opaque ink 02. Preferably, opaque inks 02 without optical brighteners are used. The printing ink 03 used is preferably a process ink in one of the color shades encompassing cyan or magenta or yellow or black. These process inks are generally in each case embodied as a transparent printing ink 03, i.e., as a printing ink 03 forming, in contrast to an opaque ink 02, a translucent ink film, wherein the respective color shade of the applied ink film is not created until a color filter-like effect that is translucent to impinging light is achieved. It is also possible, e.g., to use a Pantone ink or another transparent specialty ink, i.e., a printing ink 03 having a color shade deviating from the process colors, as the printing ink 03. Daylight inks or luminous inks or fluorescent inks or mica inks or gloss finishes or matte varnishes or textured inks are not used as printing inks 03 in the method described here. The at least one opaque ink 02 can be applied onto the relevant print substrate 01 in the same printing operation together with the at least one printing ink 03 in a printing press comprising multiple printing units, e.g., in an inline configuration, or in the relevant printing press in a printing pass preceding the printing operation applying the at least one printing ink 03, or even in a printing press that differs from the printing press applying the at least one printing ink 03.

In the proposed method for controlling the color in a printing press, an opaque ink 02 is printed onto the print substrate 01 in a first printing unit, and subsequently a transparent printing ink 03 is printed onto the opaque ink 02 in a second printing unit, during an ongoing printing process. In the process, an opaque ink 02 is used that is lighter than the surface of the print substrate 01 to be printed, and lighter than the printing ink 03 to be applied onto this opaque ink 02. It may be provided that at least two, and up to four, opaque inks 02 and/or at least two, and up to ten, printing inks 03 are applied onto the relevant print substrate 01, e.g., in the same printing press by its printing units, or by the relevant printing units if different printing presses are used, wherein each of these printing units in each case applies a single one of the opaque inks 02 and/or in each case applies a single one of the printing inks 03 onto the print substrate 01. Preferably, printing units that print according to an offset printing method are used. The printing press applying the at least one transparent printing ink 03 onto the surface of the print substrate 01 comprises a control unit, wherein in particular a control console of this printing press comprising an operating unit and a display device is used as the control unit. The color control of the printing ink 03, if necessary also the color control of the opaque ink 02, are in each case carried out in conjunction with a control, e.g., carried out by the control unit, of at least one zone opening in an inking unit associated with the printing unit of the relevant printing ink 03, or an inking unit associated with the printing unit of the relevant opaque ink 02. The measurement and control of printing inks 03 on opaque inks 02 are preferably carried out inline and online.

For the opaque ink 02 printed by one of the printing units onto the print substrate 01, at least one actual value of the optical density of this opaque ink 02 is preferably ascertained inline, i.e., in the relevant printing press, by a first detection device. The optical density of the opaque ink 02 can be detected as needed or periodically or continuously. The first detection device can also, e.g., detect a sequence of actual values of the optical density of this opaque ink 02, wherein, e.g., a mean value is calculated from this set of actual values by the control unit, and the color control is carried out using this mean value. The first detection device arranged in the relevant printing press is, e.g., configured as a densitometer or is at least suitable for carrying out a densitometric measurement. A definition range of the value of the optical density of the opaque ink 02, e.g., of opaque white, applied onto the print substrate 01 preferably ranges from zero to 3, wherein a possible number of places after the decimal point following the nominal value is generally two. A typical normal value is 2.00, e.g., a maximum, e.g., being 2.50 (very white), and a minimum, e.g., being 0.00. The higher the nominal value of the optical density of the opaque ink 02, the lighter or whiter it appears, in particular in relation to the surface of the print substrate 01 to be printed.

A film thickness of the opaque ink 02 to be applied onto the relevant print substrate 01 during the further course of the printing process is set at the relevant printing unit by a control unit detecting the at least one actual value of the optical density of this opaque ink 02, as a function of a previously ascertained value of the optical density of the surface of the unprinted print substrate 01, in such a way that the at least one actual value of the optical density of this opaque ink 02 detected by the first detection device corresponds to a target value set at this control unit for this opaque ink 02, taking a tolerance range defined in the control unit for this opaque ink 02 into consideration.

For the printing ink 03 printed onto the previously printed opaque ink 02, at least one actual value of the optical density of this printing ink 03 is preferably ascertained inline, i.e., in the relevant printing press, by a second detection device. The optical density of the printing ink 03 can be detected as needed or periodically or continuously. The second detection device can also, e.g., detect a sequence of actual values of the optical density of this printing ink 03, wherein, e.g., a mean value is calculated from this set of actual values by the control unit, and the color control is carried out using this mean value. The second detection device arranged in the relevant printing press is, e.g., configured as a densitometer or is at least suitable for carrying out a densitometric measurement. A definition range of the value of the optical density of the printing ink 03 applied onto the opaque ink 02 preferably ranges from zero to 3, wherein a possible number of places after the decimal point following the nominal value is generally two. A typical normal value is 1.50, e.g., a maximum, e.g., being 2.50 (very dark), and a minimum, e.g., being 0.00. The higher the nominal value of the optical density of the printing ink 03, the darker or more color-intensive it appears in relation to the previously applied opaque ink 02.

A film thickness of this printing ink 03 to be applied onto the opaque ink 02 during the further course of the printing process is set at the printing unit printing this printing ink 03 by the control unit that also detects the at least one actual value of the optical density of this printing ink 03, as a function of the film thickness of the opaque ink 02 previously applied onto the print substrate 01 or as a function of the actual value of the optical density of the opaque ink 02, in such a way that the at least one actual value of the optical density of this printing ink 03 detected by the second detection device corresponds to a target value set at the control unit for this printing ink 03, taking a tolerance range defined in the control unit for this printing ink 03 into consideration.

The dependence of the film thickness of the printing ink 03 to be applied onto the opaque ink 02 on the film thickness of the opaque ink 02 previously applied onto the print substrate 01, or the dependence of the film thickness of the printing ink 03 to be applied onto the opaque ink 02 on the actual value of the optical density of the opaque ink 02, in each case in particular consists of a relationship, previously defined in the control unit, between the target value of the film thickness of the printing ink 03 to be applied and the actual value of the film thickness of the opaque ink 02, or of a defined relationship between the target value of the optical density of the printing ink 03 and the actual value of the optical density of the previously applied opaque ink 02. This definition can, e.g., consist in that the color control, carried out by the control unit during an ongoing printing process in the relevant printing press, is aimed at maintaining the actual value of the optical density of the opaque ink 02 at 2.00, taking into consideration a permissible tolerance range previously defined for this opaque ink 02 in the control unit, and at maintaining the actual value of the optical density of the printing ink 03 at 1.50, taking into consideration a permissible tolerance range previously defined for this printing ink 03 in the control unit, so that the actual value of the optical density of the printing ink 03 is always, e.g., 75% of the actual value of the optical density of the opaque ink 02, despite permissible fluctuations, which are inevitable during the printing process, in the respective ink film thicknesses applied onto the print substrate 01, and thus also in the detected actual values of the optical densities. As a result of such a definition, the dependence of the optical effect of the printing ink on the film thickness of the opaque ink 02 previously applied onto the print substrate 01 is taken into consideration during a color control of the printing ink 03 carried out during an ongoing printing process in the relevant printing press.

The tolerance range defined in the control unit for the target value of the optical density of the respective opaque ink 02 or of the respective printing ink 03 is preferably in each case defined based on the printing unit and across print jobs. The control unit is provided with LAB values, but not with optical densities for each job. The control unit converts the job-based LAB values into values of the optical densities.

This method is activated at the control unit, e.g., by selecting the print substrate 01 to be printed during an upcoming printing process from a set of print substrates 01 stored in the control unit. When a printing press comprising a turning device for the print substrate 01 is used as the relevant printing press, this method is activated at the control unit, e.g., by selecting the relevant print substrate 01 in each case individually from a set of print substrates 01 that are stored in the control unit for the two sides of the print substrate 01 to be printed in the upcoming printing process.

The color of the respective opaque ink 02 or the respective printing ink 03 can in each case be controlled, e.g., using a color measurement strip printed onto the print substrate 01.

Figure 2:
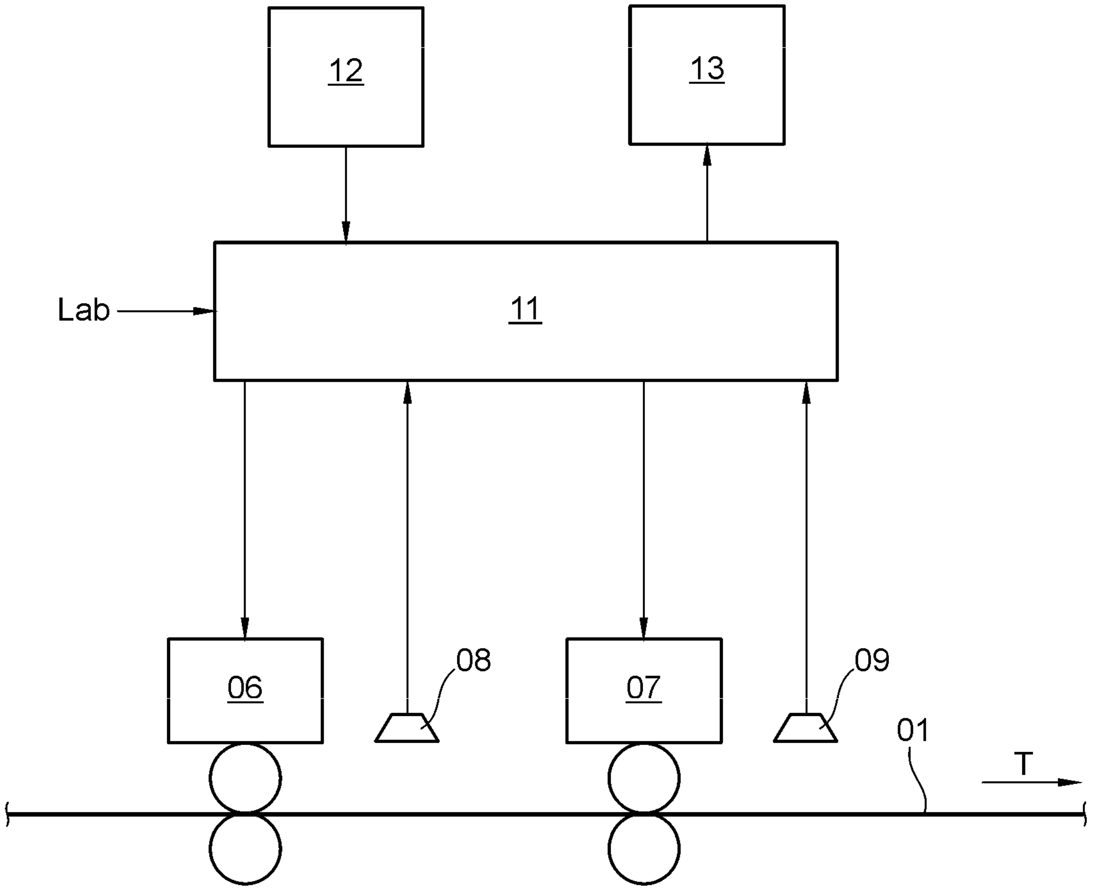
FIG. 2 a schematic representation of the ink control.

FIG. 2 shows a color control, e.g., in a printing press comprising several printing units, e.g., in a printing press printing a print substrate 01 in the form of a material web, i.e., a web-fed printing press, in a drastically simplified schematic representation. An opaque ink 02 is printed onto the print substrate 01 in a first printing unit 06, and a transparent printing ink 03 is printed thereon in a second printing unit 07, in the transport direction T through this printing press. The printing units 06; 07 are, e.g., each configured as an offset printing unit. In the transport direction T of the print substrate 01, a first detection device 08, e.g., in the form of a first inline densitometer, is arranged downstream from the first printing unit 06, and a second detection device 09, e.g., in the form of a second inline densitometer, is arranged downstream from the second printing unit 07. The first detection device 08 transmits the at least one value, detected thereby, of an optical density of the opaque ink 02 applied onto the print substrate 01 to a control unit 11. Likewise, the second detection device 09 transmits the at least one value, detected thereby, of an optical density of the printing ink 03 applied onto the print substrate 01 to the control unit 11. The control unit 11 is equipped with an operating unit 12 and a display device 13. The control unit 11 is also provided with order-based LAB values, which the control unit converts into values of optical densities. The control unit 11 is preferably a control console of this printing press. The control unit 11 activates the first printing unit 06 and the second printing unit 07 in such a way that the above-described method for color control is carried out in a printing press. Even though a bidirectional data exchange is possible between most components of the color control system, the directional arrows in FIG. 2 indicate the signal direction that is primarily required for carrying out the color control.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method for ink control in a printing press, comprising, during an ongoing printing process, an opaque ink (02) being printed onto a print substrate (01) in a first printing unit (06), and subsequently a transparent printing ink (03) being printed onto the opaque ink (02) in a second printing unit (07), a. at least one actual value of the optical density of the opaque ink (02) being ascertained by a first detection device (08), configured as a densitometer, for the opaque ink (02) printed onto the print substrate (01);

b. a film thickness of the opaque ink (02) to be applied onto the print substrate (01) being set at the relevant printing unit (06) by a control unit (11) detecting the at least one actual value of the optical density of the opaque ink (02), as a function of a previously ascertained value of the optical density of the surface of the unprinted print substrate (01), in such a way that the at least one actual value of the optical density of the opaque ink (02) detected by the first detection device (08) corresponds to a target value set at the control unit (11) for the opaque ink (02), taking a tolerance range defined in the control unit (11) for the opaque ink (02) into consideration;

c. at least one actual value of the optical density of the printing ink (03) being ascertained by a second detection device (09), configured as a densitometer, for the printing ink (03) printed onto the previously printed opaque ink (02); and d. a film thickness of the printing ink (03) to be applied onto the opaque ink (02) being set at the printing unit (07) printing the printing ink (03) by the control unit (11) which also detects the at least one actual value of the optical density of the printing ink (03), as a function of the film thickness of the opaque ink (02) previously applied onto the print substrate (01) or as a function of the actual value of the optical density of the opaque ink (02), in such a way that the at least one actual value of the optical density of the printing ink (03) detected by the second detection device (09) corresponds to a target value set at the control unit (11) for the printing ink (03), taking a tolerance range defined in the control unit (11) for the printing ink (03) into consideration.

2. The method according to claim 1, characterized in that the dependence of the film thickness of the printing ink (03) to be applied onto the opaque ink (02) on the film thickness of the opaque ink (02) previously applied onto the print substrate (01), or the dependence of the film thickness of the printing ink (03) to be applied onto the opaque ink (02) on the actual value of the optical density of the opaque ink (02), in each case consists of a relationship between the target value of the film thickness of the printing ink (02) to be applied and the actual value of the film thickness of the opaque ink (02), or of a defined relationship between the target value of the optical density of the printing ink (03) and the actual value of the optical density of the previously applied opaque ink (02).

3. The method according to claim 1, characterized in that opaque white or a non-transparent ink in one of the color shades encompassing gold or silver is used as the opaque ink (02), and that a process ink in one of the color shades encompassing cyan or magenta or yellow or black is used as the printing ink (03) or that a Pantone ink or another transparent specialty ink is used as the printing ink (03).

4. The method according to claim 1, characterized in that at least two, and up to four, opaque inks (02) and/or at least two, and up to ten, printing inks (03) are applied onto the print substrate (01) by different printing units (06; 07), each of these printing units (06; 07) in each case applying a single one of the opaque inks (02) onto the print substrate (01) and/or in each case applying a single one of the printing inks (03) onto one of the opaque inks (02).

5. The method according to claim 1, characterized in that an opaque ink (02) is used that is lighter than the surface of the print substrate (01) to be printed, and lighter than the printing ink (03) to be applied onto the opaque ink (02).

6. The method according to claim 1, characterized in that the ink control of the opaque ink (02) and the ink control of the printing ink (03) are in each case carried out in conjunction with a control, carried out by the control unit (11), of at least one zone opening in an inking unit associated with the printing unit (06) of the opaque ink (02), or an inking unit associated with the printing unit (07) of the printing ink (03).

7. The method according to claim 1, characterized in that printing units (06; 07) that print according to an offset printing method are used.

8. The method according to claim 1, characterized in that a sheet-format print substrate (01) or a web-format print substrate (01) is used and/or that a print substrate (01) made of paper or a plastic material or metal is used.

9. The method according to claim 1, characterized in that a control console comprising an operating unit (12) and a display device (13) is used as the control unit (11).

10. The method according to claim 1, characterized in that the method is activated at the control unit (11) by selecting the print substrate (01) to be printed during an upcoming printing process from a set of print substrates (01) stored in the control unit (11).

11. The method according to claim 1, characterized in that a printing press comprising a turning device for the print substrate (01) is used as the printing press, the method being activated at the control unit (11) by selecting the relevant print substrate (01) in each case individually from a set of print substrates (01) that are stored in the control unit (11) for the two sides of the print substrate (01) to be printed in the upcoming printing process.

12. The method according to claim 1, characterized in that the tolerance range defined in the control unit (11) for the target value of the optical density of the respective opaque ink (02) or the respective printing ink (03) is in each case defined based on the printing unit and across print jobs.

13. The method according to claim 1, characterized in that the at least one opaque ink (02) is applied in the same printing operation together with the at least one printing ink (03) in a printing press comprising a plurality of printing units (06; 07), or that the at least one opaque ink (02) is applied in the relevant printing press in a printing pass preceding the printing operation applying the at least one printing ink (03), or that the at least one opaque ink (02) is applied onto the print substrate (01) in a printing press that differs from the printing press applying the at least one printing ink (03).

* * * * *